July 3, 1951  H. L. CROWLEY ET AL  2,558,823
APPARATUS FOR MOLDING ARTICLES
Filed May 27, 1949  2 Sheets-Sheet 1

INVENTORS
Henry L. Crowley
BY Arthur M. Hossenlopp
Robert S. Dunlap
ATTORNEY

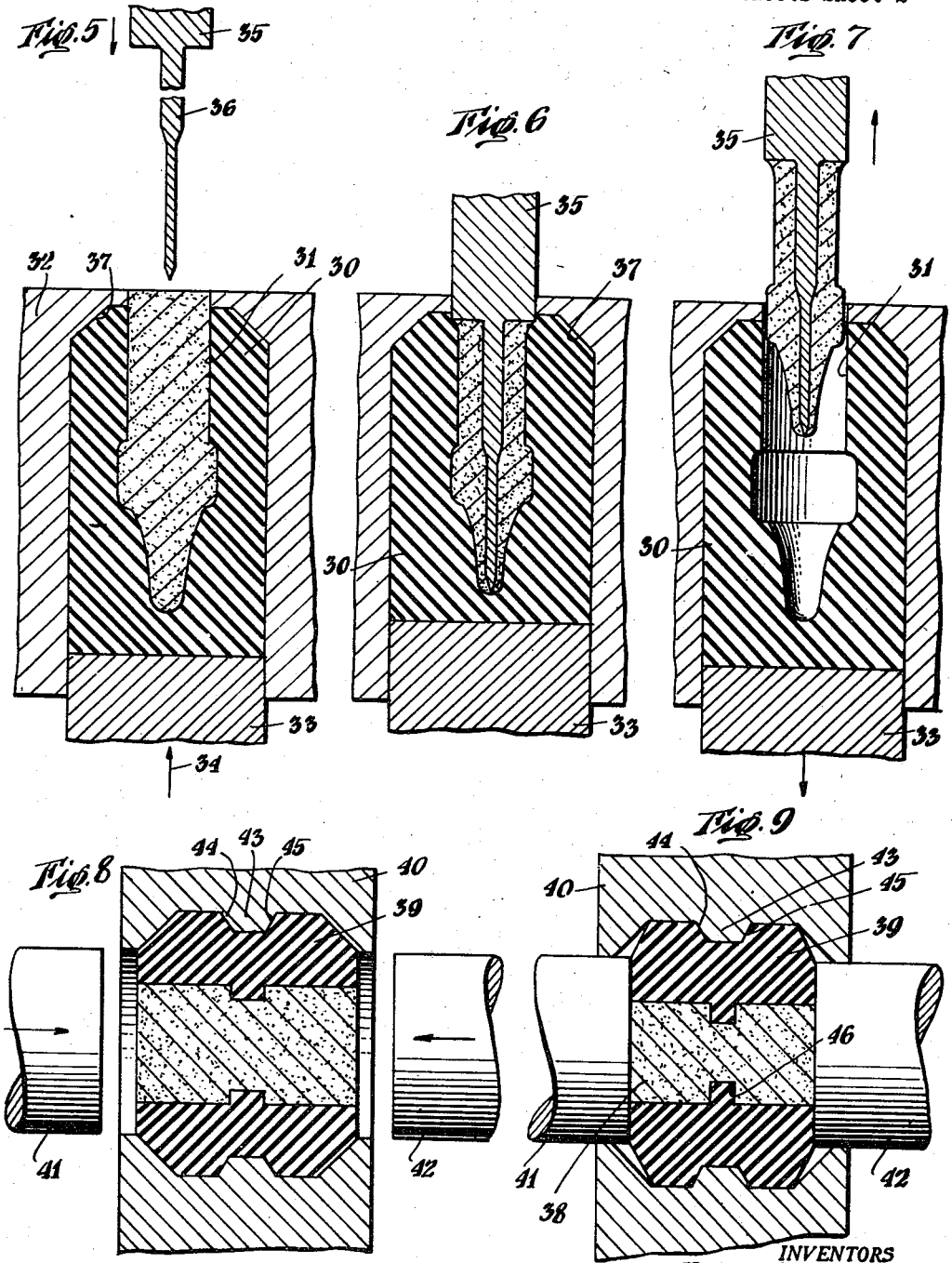

Patented July 3, 1951

2,558,823

UNITED STATES PATENT OFFICE 2,558,823

APPARATUS FOR MOLDING ARTICLES

Henry L. Crowley, South Orange, and Arthur M. Hossenlopp, Maplewood, N. J.

Application May 27, 1949, Serial No. 95,803

8 Claims. (Cl. 18—16)

This invention relates to apparatus for molding articles and more particularly to apparatus for molding articles from moldable materials wherein at least a part of the molding means, i. e. a die means, or the like, is formed of a yieldable material, which may flow under pressure and within its elastic limit to change the form of the mold cavity.

The term "moldable material" as used herein to define the material used in forming the products being made is intended to be interpreted in a broad sense to include not only material which will flow under pressure, such as a plastic clay mass having about 50% clay and 20%–25% water, but also materials which may be formed or molded by the application of pressure thereto, but which do not flow under pressure. Such non-flowing materials include many of the powdered metals. As such, this term is intended to include any type of material which may be molded by press molding methods, such materials including ceramic materials with more or less water or other liquids mixed therewith, organic plastic molding compositions such as are well known in the art, powdered metals or mixtures thereof, or materials including substantial proportions of one or more powdered metals and other materials or mixtures which lend themselves to molding by recognized press forming methods and which may be molded by apparatus as herein disclosed in accordance with the teachings hereinafter particularly set forth. It will be understood, of course, that some of these materials may require the maintenance of certain temperatures during the molding operations. In such an event, it will be understood that any suitable temperature controlling means may be employed for providing the necessary temperature and temperature control. Such means, if used, however, form no part of the present invention and will not be further referred to herein.

The invention particularly relates to the provision of a part of similar yieldable material for forming a reentrant cavity on or in an article being formed, so as to provide for the making of articles in a better manner than could be done with conventional molding means. The invention further relates to the making of articles having one or more reentrant cavities therein, which are so arranged and disposed that the formed articles could not be removed from the molding apparatus without first retracting the portion of the molding apparatus used in forming such cavity or cavities. In such case the retractable portion of the molding apparatus is similarly made from a yieldable material which has the characteristics of flow within its elastic limit so as to be movable into and retractable from a cavity as aforesaid. A preferred yieldable and flowable material for use in accordance with this invention is rubber or a rubber-like composition.

Among the objects of the present invention is to provide for the forming of articles in molds including a part at least of a yieldable material, such as rubber or a rubber-like composition, in which provision is made for the flow under pressure of the yieldable material incident solely to axial pressure applied in press-forming the articles, the axial pressure being applied solely on a single pressure axis, so as to avoid the requirement heretofore found necessary for the supplying of lateral pressure by fluid pressure means or otherwise to cause movement of a flexible mold part during the forming or molding operation.

It has been found in the molding of articles with molds having rubber or rubber-like parts or portions that there is a resistance or reluctance of the rubber or rubber-like material to move or flow laterally, this resistance or reluctance having been attributed in the past to friction between the rubber or rubber-like portion and some other part or parts of the molding means. It is, therefore, a further object of the present invention to provide a construction of the molding means such as to convert a part of the axial pressure force into lateral force, effective upon the rubber or rubber-like portion at a desired zone or place, so as to provide desired characteristics of flow for the rubber or rubber-like mold portion and at the same time to provide desired shape characteristics for the final article to be formed. Specifically it is an object of the present invention to provide beveled engaging surfaces between a relatively non-yielding part of the molding means and a part of the rubber or rubber-like mold portion which will be effective during the actual press molding operation to effect a resolution of forces such as to provide a lateral component of force effective upon the rubber or rubber-like mold member aforesaid. The beveled surface of the relatively non-yielding mold portion may be formed either upon a separate piece provided for the purpose or upon a part integral with one of the molding parts otherwise provided.

A further and detailed object of the invention is to provide apparatus by which substantially square cornered recesses or shoulder portions may be formed upon articles being molded as aforesaid by the provision of apparatus as hereinabove set forth.

Other and more detailed objects of the present invention will become apparent from the following specific description of practical embodiments of the invention and will be pointed out in the appended claims, all when considered in conjunction with the accompanying drawings, in which:

Fig. 5 is a view in central vertical section similar to Fig. 1, but showing a further modification of the present invention, in this case for forming a spark plug body;

Fig. 6 is a view similar to that of Fig. 5, but with the parts shown in the positions they occupy at the end of the press-forming operation, but before relieving the pressure or retracting the parts;

Fig. 7 is a similar view of the apparatus of Figs. 5 and 6, showing the parts in position during the stripping of a formed article from the mold, the article being shown on the end of the pressing plunger;

Figure 1:
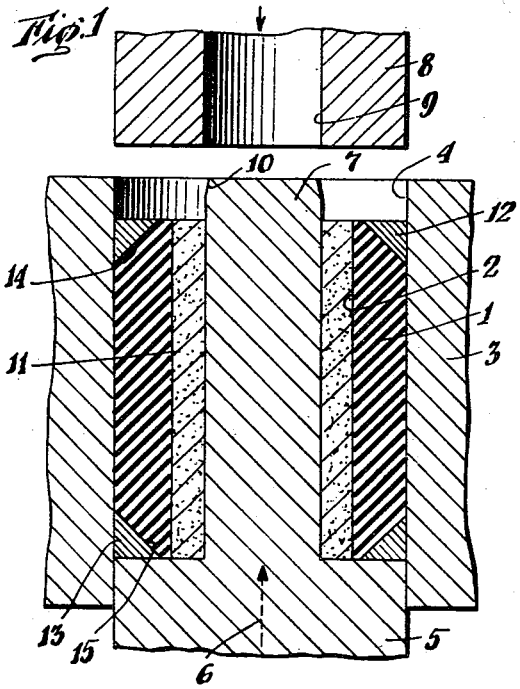
Figure 1 is a diagrammatic view principally in central vertical section, illustrating apparatus for the molding of a hollow cylindrical tubular article, the parts being shown in a position prior to the pressing operation but after the mold has been filled with moldable material.
Figure 3:
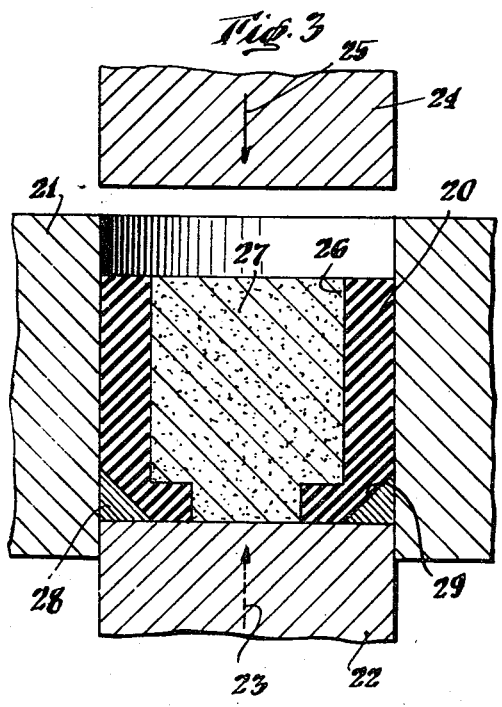
Fig. 3 is a view similar to that of Fig. 1 showing a modification of the invention for the forming of an article having two diameters meeting at a shoulder.

Fig. 8 is a view similar to those of Figs. 1, 3 and 5 of a further modification of the invention illustrating the forming of a cylindrical article having a substantially rectangular reentrant groove around the center portion thereof; and Fig. 9 is a view of the apparatus of Fig. 8 with the parts in the position they occupy at the end of the press-forming operation and prior to the movement apart of the several movable parts of the molding apparatus.

In the past it has been known to make formed articles from moldable material by press molding operations, wherein the press molding apparatus has employed as a part of the mold body or mold forming means, a body of yieldable material such as rubber or a rubber-like composition. In some instances, such apparatus has worked quite satisfactorily. It has been found, however, that when some articles having particular shapes are to be molded so that the articles as removed from the mold will have the exact desired shape, difficulty has been experienced due to the fact that the rubber or rubber composition flows in a somewhat uncontrollable manner. As a result, machining or grinding operations have been resorted to quite commonly in order to trim or dress the molded articles after removal from the mold to bring them to the exact shape eventually desired. This has been true, for example, even in the molding of such simple pieces as hollow cylindrical bodies. In such instances when the lateral sides of the mold have been formed of rubber or a rubber composition, the rubber has been compressed incident to the molding pressure and has flowed to give a smaller diameter toward the center of the mold body, i. e. intermediate the ends considered from the point of view of the pressure axis (usually vertical), but the end portions of such a body have been closer to the original mold diameter prior to the expansion or flow of the rubber. This has been attributed in the past to friction between the end portions of the rubber body used in forming the sides of the mold, and the pressing means, usually a plunger or plunger assembly. This friction seems in some way to have prevented lateral flow of the rubber or rubber composition which would be required in order to form a truly cylindrical body. Thus the bodies as actually molded have been more or less spool shape. Attempts have been made to cure this difficulty in various ways including that of providing inwardly directed flanges on the rubber body at the end portions thereof. However, even in such cases the results have left much to be desired.

The present invention seeks to overcome this difficulty and also to overcome difficulties incident to attempts to form substantially square shouldered recesses or rectangular shaped recesses by providing a component of force effective laterally upon the rubber or rubber composition tending to move it toward the article being molded, so as to give the exact desired shape, without requiring subsequent dressing or trimming operations, or at least minimizing such operations if used.

In accordance with the forms of the invention shown in Figs. 1 to 9 inclusive of the drawings, a mold body is provided which has a central or lining portion of a rubber or rubber-like material or composition, hereinafter referred to as "rubber." By the use of this term, there is intended to be included not only natural, but any synthetic rubbers and compositions thereof which have the physical characteristics enabling the use of such material in accordance with the specific teaching of the present invention. Broadly the material may be said to be a yieldable material which has flow characteristics within its elastic limit when subjected to molding pressures. As such, the particular chemical composition of this material is not important from the point of view of the present invention, as various materials are known to the art which have the desired physical characteristics and which, therefore, are suitable for use in accordance with the teaching of the present invention.

Figure 2:
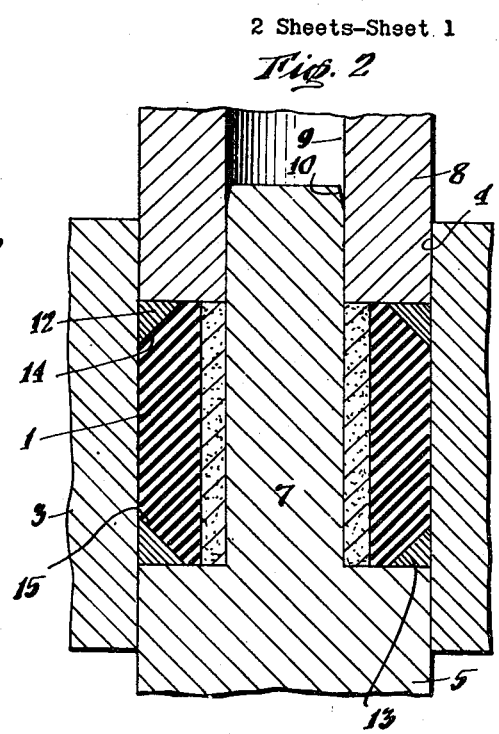
Fig. 2 is a view of the apparatus of Fig. 1, showing the parts in the position they occupy at the end of the pressing operation, but prior to the movement apart of the several parts and the removal of the formed article from the mold.

Turning now to the form of the invention particularly shown in Figs. 1 and 2, there is provided a mold body 1 formed of rubber or a rubber-like composition which has a mold cavity 2 therein, shown in the present instance as being substantially cylindrical for forming a substantially hollow cylindrical article. It will be understood that the mold body 1 is of material having the desired physical characteristics of yieldability and flow under pressure within its elastic limit. Furthermore, the mold cavity 2 is larger than the final desired shape or size for the final desired article as will be seen by a comparison of Figs. 1 and 2. Surrounding the mold body 1 is a mold means 3 having a substantially cylindrical cavity 4 therein, the diameter of which is approximately equal to the normal outside diameter of the mold body 1, i. e. the outside diameter of this body when not subjected to external forces. The mold means 3 is preferably formed of some suitable relatively non-yielding material (as compared to the material of the mold body 1), such as cast iron or steel. This body 3 serves to confine the body 1 against outward, lateral expansion during the pressing operation hereinafter to be described.

Means are provided for closing the ends of the molding means thus far described. In the present instance the mold body 1 is arranged with its axis substantially vertical, although this is not an absolute requirement, but is merely a conventional arrangement. The bottom closing means here indicated generally at 5 is formed of any suitable, preferably non-yielding material, such as that of the mold means 3, and as shown is arranged separate from the mold means 3, so as to be movable in respect thereto as indicated by a dotted arrow 6. This relative movement is, however, not required under all circumstances, but may be desired in a particular case. Thus the bottom closing means 5 could be formed integral with the mold means 3 if desired.

In the forming of a hollow article such as the hollow cylindrical article being formed as shown in Figs. 1 and 2, it is necessary that a center core means be provided. In the present instance this core means 7 is formed as a part of the bottom closing means 5. It will be understood, however, that if desired the core means 7 could be formed as a separate part rather than as integral with the bottom closing means 5.

In completing the principal portions of the mold there is provided a pressing plunger 8, here shown in part only as an annular plunger having a central bore or hole 9 of a size freely, but fairly closely, to receive the core means 7 and an outside diameter freely, but fairly closely, to fit inside the cylindrical aperture 4 in the mold 3. To facilitate the entry of the upper end of the core means 7 into the bore 9 in the pressing plunger 8, the upper end portion of the core means 7 is relieved or chamfered as shown at 10. It will be understood that this construction is purely mechanical and forms no necessary part of the present invention.

In operating the device as thus far described, suitable molding material is supplied in any desired manner to an annular space 11 between the inside boundaries of the mold cavity 2 and the outside of the core means 7. If, therefore, the mold body 1 of the rubber or rubber-like material were of a size and shape to fill all the remaining space permitted by the parts thus far described, the device thus formed would be substantially in accordance with prior art practices, and upon downward movement of the plunger 8 or relative movement as between the plunger 8 and the mold parts 3 and 5, the rubber body 1 would be compressed substantially to the form of Fig. 2, but with the exception, however, that the end portions of the body 1 would not have any substantial force exerted thereon tending to move them inwardly from the Fig. 1 position to that of Fig. 2. As a result, a hollow spool-like molded article would be formed.

In order to prevent such undesired operation in accordance with the present invention, means are provided for supplying a force directed laterally on the portion of the rubber-like body 1 in contact with the end portions of the article to be formed, so as to form an exactly cylindrical outer surface on the article. For this purpose, in accordance with the present invention, there is provided upper and lower beveled inserts 12 and 13 respectively, which are made of some suitable non-yielding material such as a metal or a metal composition having desired characteristics including particularly physical strength. These inserts 12 and 13 provide beveled surfaces 14 and 15 respectively engaging correspondingly beveled surfaces of the mold body 1.

In the present instance these beveled surfaces are annular in character and extend entirely around the mold body ends. It will be understood, however, that the invention contemplates the provision of such beveled surface on any one side only if they are used in forming particular shapes on the article being made, which shapes are peculiar to the side at which the beveled surfaces are provided.

The beveled surfaces 14 and 15 are believed to operate as follows: The beveled surface 14 cooperates with the force exerted through the yieldable mold body 1 from the bottom closure member 5, so as to resolve a part of the axially exerted force to provide a lateral component of force effective upon the upper portion of the mold body 1 horizontally opposite the beveled surface 14 as seen in Figs. 1 and 2. In a similar way the beveled surface 15 acts in conjunction with the force exerted from the pressing plunger 8 through the yieldable mold body 1 to resolve a part of the axially directed force into lateral force effective on the portion of the mold body 1 horizontally opposite the surface 15 as seen in Figs. 1 and 2. Thus there are provided laterally directed forces formed by resolution of forces, incident to the provision of these beveled surfaces and effective to provide the necessary force upon the yieldable mold body 1 at a zone or zones, where it might otherwise be inhibited from movement incident to friction or for some other reason, so as to provide a truly cylindrical body for the formed article as shown in Fig. 2.

While the inserts 13 are here shown as separate from all the mold parts 3 and 5, and 8, it will be understood that the same or equivalent results may be obtained if these inserts are formed integral with a suitable one of the mold parts. For instance, if the bottom closing means 5 is made separate from and relatively movable in respect to the mold means 3 as shown in Figs. 1 and 2, then the inserts 13 may be made integral with the means 5 if desired. In any event the reaction desired is between the beveled surface 15 of the insert 13 and the pressing plunger 8 in this respect. If on the other hand, it is desired to make the insert 12 integral with some one part of the mold means otherwise or usually provided, then this insert must be made as a part of or moving with the pressing plunger 8, so as to be movable in respect to the mold body 3 from the position shown in Fig. 1 to that shown in Fig. 2, and so that it may react with pressure supplied through the mold body 1 from the bottom closing means 5. Under some circumstances, as hereinafter more particularly set forth by way of example and illustration, the beveled surface or surfaces may be formed on a part integral with the mold means 3 or equivalent part. In the form shown in Fig. 1, however, if the mold means 3 and 5 were not intended for relative movement or were integral, then the insert member 13 could be formed integral or rigid with either or both and the desired results obtained.

Figure 4:
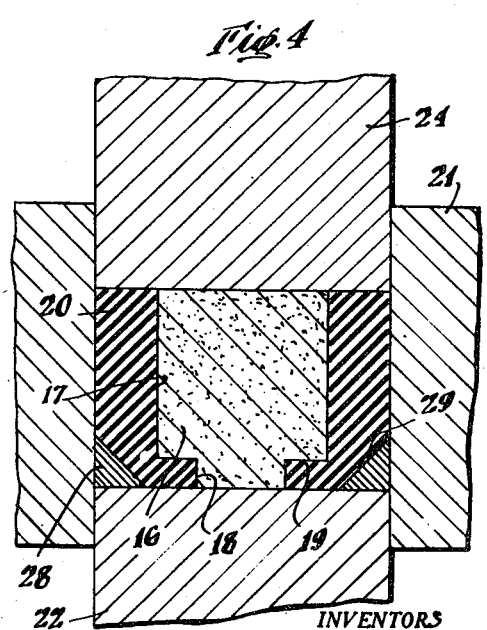
Fig. 4 is a similar view showing the parts of the Fig. 3 form of the invention in the position they occupy at the completion of the pressing operation and prior to the parts being moved apart for the removal of a formed article from the mold.

Turning now to the form of the invention shown in Figs. 3 and 4, there is provided a means for forming an article which is generally cylindrical in outer contour, but includes cylindrical portions of two different diameters at different zones in its length. Considered from another point of view, it has an annular rabbet at its lower end portion as shown. The final desired shape for the article is shown in central vertical section at 16 in Fig. 4, the larger diameter portion being indicated at 17 and the smaller diameter portion at 18, these portions meeting at a shoulder 19. In order that the shoulder 19 between the two diameter portions 17 and 18 be substantially exact in the form shown, it is necessary that lateral force be applied to the flexible and yieldable material of a rubber-like mold body here shown at 20. Considering this form of the invention generally, the mold body 20 is shown in its unstrained or undistorted form in Fig. 3 and in the form which it takes upon the application of pressure in Fig. 4. As shown, the mold body 20 is laterally enclosed within a mold 21 having a bottom closure member 22, which is arranged for vertical movement in respect to the mold 21 as indicated by a dotted arrow 23. Cooperating with the upper end the mold 21 is a pressing plunger 24 intended for movement downward in the form shown as indicated by an arrow 25. Prior to the molding operation, the mold cavity 26 in the rubber-like mold body 20 is suitably filled with molding material indicated at 27.

In order to provide the desired lateral component of force effective on the article to be formed at and adjacent to the shoulder 19, there is provided a beveled insert 28 having a beveled surface 29 upon which is seated a corresponding beveled surface of the mold body 20. It will be noted that the beveled surface 29 is laterally opposite the end portion of the article to be formed as well as opposite the shoulder 19 formed at the juncture of the two diameters 17 and 18 of the article to be formed. This construction in practice results in the transmission of lateral force to and through the rubber-like mold body 20 such as to enable the accurate forming of articles as shown.

If desired, in order that the upper portion of the article 16 being formed be exactly cylindrical, inserts as shown at 12 in Figs. 1 and 2 could be used. These are not shown, however, as they would be exactly in the form particularly described in connection with the Figs. 1 and 2 form of the invention.

The action as to this form of the invention is substantially similar to that previously described in respect to Figs. 1 and 2, the beveled surface 29 acting with the pressure from the pressing plunger 24 transmitted through the rubber-like mold body 20 to provide a lateral component of force effective on the rubber-like body or parts thereof horizontally opposite the beveled surface 29 as shown to attain the desired results as aforesaid.

In Figs. 5, 6 and 7 there is shown a further form of the present invention, in this instance for forming a spark plug body, such as are customarily formed from ceramic material supplied to the molding means as a slip or a stiff mud. As shown in these figures, a rubber-like mold body 30 is provided having a suitably shaped cavity 31 therein and enclosed within a lateral mold member 32 corresponding generally to the mold means 3 of Fig. 1. The mold member 32 has a bottom closure means 33, which is provided for relative vertical movement in respect to the mold member 32 as indicated by an arrow 34 and as seen by comparison of Figs. 5 and 6. In this instance the vertical movement of the bottom closure means 33 is quite important. Also cooperating with the mold parts thus far described is a pressing plunger 35, which is arranged for movement into and out of the mold as shown by a comparison of Figs. 5 to 7, pressure being applied thereto for this purpose by any suitable means (not shown) such as those known in the press molding art. The plunger 35 is provided at its lower end with a needle-like portion 36 for forming an internal cavity in the article and for forming a passage therethrough for the usual center electrode.

As shown the mold body 30 is intended to have a fairly free fit in the cylindrical part of the cavity in the mold member 32. This is to permit of relative vertical movement between these parts as is required as shown by a comparison of Figs. 5 and 6. If desired this free relative movement may be further assured by the use of some suitable lubricant between these parts, such as finely divided mica or graphite. Petroleum oils are usually not desired as lubricants in this connection due to their chemical attack on the rubber body 30. This same expedient of lubricating relatively movable rubber to metal contacting surfaces may be employed in connection with other embodiments of the invention herein described.

In order that the upper portion of the formed article be made of a substantially cylindrical contour, rather than of some other shape which would require trimming by machining or a grinding operation, means are provided in accordance with the present invention including a beveled surface 37 here provided on a part integral with the mold member 32. This beveled surface is arranged to react with pressure transmitted from the bottom closure member 33 of the mold through the rubber-like mold body 30, to effect a resolution of a part of the axially directed pressing force to provide inwardly directed lateral force effective upon a part of the mold body 30 horizontally opposite and adjacent to the beveled surface 37.

This provision enables the mold body 30 to mold a spark plug body of a desired shape without the neecssity of resorting to the use of a relatively more flexible rubber body combined with laterally applied fluid pressure, as was deemed necessary in accordance with certain at least of the prior art practices in the making of articles of this type.

It is particularly to be noted in this form of the invention that the beveled surface 37 provided in accordance with the present invention is formed on a part integral with the lateral mold body, rather than on a separate piece, and rather than on a part integral with either the upper or the lower closures of the mold body as was referred to hereinabove.

The form of the invention illustrated in Figs. 8 and 9 involves a double use of inclined surfaces in order to produce in an article being formed a pair of substantially square shoulders, particularly as a part of a substantially rectangular shaped annular recess.

As shown in these figures, the mold is arranged substantially horizontally, i. e. the pressure axis is horizontal, rather than vertical. This is not essential, however, but merely is used to indicate that the vertical application of pressure is not per se an essential part of the present invention. It will be understood, however, that the apparatus shown with a horizontal pressure axis in Figs. 8 and 9 could be used by being bodily turned so that all the parts are disposed at right angles to the positions shown and with a vertical application of pressure, which in many instances would be considered preferable.

As shown in these figures, the article to be formed is indicated in transverse vertical section at 38 in Fig. 9 and is formed as a cylindrical body having a substantially square sided annular groove approximately midway between the ends of the cylinder, the groove being parallel to the ends thereof. The molding means used includes a rubber-like mold body 39 confined laterally of the axis of pressure by a mold member 40 and having end closures 41 and 42, each of which is formed as a pressing plunger and is arranged for movement in respect to the mold parts 39 and 40 as shown by a comparison of Figs. 8 and 9. In this form of the invention the mold member 40 is provided with an annular rib portion 43 integral therewith and having a pair of beveled surfaces 44 and 45, which are in close engagement with correspondingly beveled surfaces forming the sides of an annular groove in the outside of the mold body 39. Thus the beveled surface 44 reacts with pressure transmitted through the mold body 39 from the end closure or pressing plunger 41; and the beveled surface 45 similarly reacts with pressure transmitted through the mold body 39 from the end closure or pressing plunger 42, in both instances to provide inwardly directed components of lateral force, assuring that the rubber-like mold body is forced into the desired shape to form an annular groove as shown at 46, Fig. 9. It will be understood that the outside diameter of the main portion of the article 38 as finally formed must be less or at least no greater than the inside diameter of the groove-forming parts of the mold body 39 in its unstrained condition as shown in Fig. 8, so as to permit the removal of the finished article without damage thereto and to permit the reuse of the mold body 39. However, it has been found that by the provision of means as shown in these figures, substantially square sided grooves may be formed. This form of the invention therefore involves merely a double use of the same type of structure previously described in connection with other forms of the invention. Here again the beveled surfaces are formed as shown on a part integral with the lateral mold member indicated at 40 in this figure, rather than upon separate inserts.

While there has been shown and described several modifications of the present invention, illustrating how the principles thereof may be applied in different ways, we do not wish to be limited except by the scope of the appended claims, which are to be construed validly, as broadly as the state of the prior art permits.

What is claimed is:

1. Apparatus for molding articles from moldable material to a predetermined shape and size, comprising a mold body of a yieldable material which has flow characteristics within its elastic limit when subjected to molding pressures, said mold body having a mold cavity formed therein of a size larger than said predetermined size and a shape similar to the shape of the articles to be molded, such that when subjected to pressure in molding an article, the flow of the material of said mold body will cause a reduction of the cavity therein to said predetermined shape and size, means formed of relatively non-yielding material for laterally confining said mold body, means formed of relatively non-yielding material for closing the ends of said laterally confining means, at least one of said end closing means being axially movable in respect to said laterally confining means for applying axial pressure for molding an article, said mold body having at least one beveled surface on its exterior arranged to engage a similarly beveled surface formed on a portion of relatively non-yielding material, said portion being rigid with one of said means formed of relatvely non-yielding material and being relatively axially moved with respect to one of said end closing means during the molding operation, whereby solely axial pressure applied to at least one of said end closing means will be converted in part to lateral force by said beveled surfaces, tending to cause lateral flow of a part of said mold body toward the mold cavity therein.

2. Apparatus for molding articles from moldable material to a predetermined shape and size, comprising a mold body of a yieldable material which has flow characteristics within its elastic limit when subjected to molding pressures, said mold body having a mold cavity formed therein of a size larger than said predetermined size and a shape similar to the shape of the articles to be molded, such that when subjected to pressure in molding an article, the flow of the material of said mold body will cause a reduction of the cavity therein to said predetermined shape and size, means formed of relatively non-yielding material for laterally confining said mold body, means formed of relatively non-yielding material for closing the ends of said laterally confining means, at least one of said end closing means being axially movable in respect to said laterally confining means for applying axial pressure for molding an article, said mold body having at least one beveled surface on its exterior arranged to engage a similarly beveled surface formed on a portion of relatively non-yielding material, said portion being a part integral with said means for laterally confining said mold body, the similarly beveled surface formed on said portion facing in the direction of one of said end closing means which is axially movable as aforesaid, this movable end closing means cooperating with said beveled surfaces to convert a part of the solely axial pressure applied through the removable end closing means to lateral force for causing a lateral flow of a part of said mold body toward the mold cavity therein.

3. Apparatus for molding an article from moldable material to a predetermined size and with a generally cylindrical shape having a substantially rectangular annular groove intermediate its ends arranged in a plane generally parallel to such ends, comprising a mold body of a yieldable material which has flow characteristics within its elastic limit when subjected to molding pressures, said mold body having a mold cavity formed therein of a size larger than the predetermined substantially cylindrical shape of the article to be formed and having an inwardly directed annular rib for forming said annular groove, the inside diameter of said rib, when said yieldable material is not subjected to molding pressures, being greater than the outside diameter of the cylindrical portion of an article to be molded, said mold body having such dimensions that when subjected to pressure in molding an article, the flow of the material of said mold body within its elastic limit will cause a reduction of the size of the mold cavity therein to the predetermined shape and size of the article to be molded, means formed of relatively non-yielding material for laterally confining said mold body, an inwardly directed annular rib integral with the non-yielding material of said laterally confining means, located substantially opposite said annular rib on said mold body, and having beveled surfaces facing the opposite ends of said mold cavity respectively, said mold body having an annular recess therein shaped and positioned closely to receive said inwardly directed rib of non-yielding material and beveled to conform to the beveled surfaces thereof, and pressing plunger means of relatively non-yielding material for closing the ends of said laterally confining means and for supplying pressure to said mold body and moldable material therein for forming such moldable material into an article, said end closing means being simultaneously movable in respect to said mold body and said laterally confining means in the forming of an article, whereby the beveled surfaces of said mold body and of the cooperating inwardly directed rib of non-yielding material serve to exert lateral pressure upon the portion of said mold body adjacent to the inwardly directed rib thereof by resolution of parts of the forces of the axially directed pressures of said end closing means, tending to cause a lateral flow of a part of said mold body for facilitating the forming of a substantially rectangular annular groove in an article being molded.

4. Apparatus for molding articles from moldable material to a predetermined shape and size, comprising a mold body of a yieldable material which has flow characteristics within its elastic limit when subjected to molding pressures, said mold body having a mold cavity formed therein of a size larger than said predetermined size and a shape similar to the shape of the articles to be molded, such that when subjected to pressure in molding an article, the flow of the material of said mold body will cause a reduction of the cavity therein to said predetermined shape and size, means formed of relatively non-yielding material for laterally confining said mold body, means formed of relatively non-yielding material for closing the ends of said laterally confining means, at least one of said end closing means being axially movable in respect to said laterally confining means for applying axial pressure for molding an article, said mold body having at least one beveled surface on its exterior arranged to engage a similarly beveled surface formed on a portion of relatively non-yielding material, said portion being rigid, during the normal operation of forming an article, with one of said means formed of relatively non-yielding material, but being formed as a separate piece from any of said means of non-yielding material and axially movable in respect to one of said end closing means during the molding operation, whereby solely axial pressure applied to said one of said end closing means will be resolved in part to lateral force by said beveled surfaces, tending to cause lateral flow of a part of said mold body toward the mold cavity therein.

5. Apparatus for molding articles from moldable material to predetermined shape and size, wherein said shape is uniform about a single predetermined axis, comprising a mold body of a yieldable material which has flow characteristics within its elastic limit when subjected to molding pressures, said mold body having a mold cavity formed therein of a size larger than said predetermined size and a shape similar to the shape of the articles to be molded, such that when subjected to pressure in molding an article, the flow of the material of said mold body will cause a reduction of the cavity therein to said predetermined shape and size, means formed of relatively non-yielding material for laterally confining said mold body, means formed of relatively non-yielding material for closing the ends of said laterally confining means, at least one of said end closing means being axially movable in respect to said laterally confining means for applying axial pressure for molding an article, said mold body having at least one annular beveled surface on its exterior arranged to engage a similarly beveled surface formed on an annular portion of relatively non-yielding material, said portion being rigid with one of said means formed of relatively non-yielding material and being relatively axially moved with respect to one of said end closing means during the molding operation, the beveled surface on said annular portion facing the end of the cavity of said mold body toward which one of said end closing means is movable, so that the axial force exerted upon said mold body by said movable end closing means will be resolved in part by said beveled surfaces into lateral force tending to cause an elastic flow of the material of said mold body laterally opposite the beveled surface thereof in a direction inwardly of the mold cavity of said mold body.

6. Apparatus for molding hollow cylindrical articles from moldable material to a predetermined size, comprising a mold body of a yieldable material which has flow characteristics within its elastic limit when subjected to molding pressures, said mold body having a cylindrical mold cavity formed therein of a size larger than said predetermined size, such that when subjected to pressure in molding an article, the flow of the material of said mold body will cause a reduction of the cavity therein to said predetermined size, means formed of relatively non-yielding material for laterally confining said mold body, two means formed of relatively non-yielding material for closing the ends respectively of said laterally confining means, both said end closing means being axially movable in respect to said laterally confining means for applying axial pressure for molding an article, said mold body having two beveled surfaces on its exterior arranged respectively to engage similarly beveled surfaces formed on portions of relatively non-yielding material, said portions being annular in form and rigid with said end closing means respectively during the operation of molding an article, and each of said portions cooperating with one of said end closing means which is movable relative thereto to effect a resolution of a part of the axially applied force incident to the movement of such end closing means into lateral force tending and effective to cause a lateral flow of the material of said mold body within its elastic limit and radially inwardly of the mold cavity in said mold body.

7. Apparatus for molding articles in accordance with claim 6, wherein said portions are formed as separate beveled annular rings adapted in the molding operation in forming an article to be rigid and immovable in respect to said end closing means respectively, but movable in respect thereto in assembling and disassembling the parts of the molding apparatus.

8. Apparatus for molding articles of generally cylindrical external contour and having two diameters meeting at an annular shoulder, comprising a mold body of a yieldable material which has flow characteristics within its elastic limit when subjected to molding pressures, said mold body having a mold cavity formed therein of a size larger than that of an article to be molded and a shape similar thereto, such that when subjected to pressure in molding an article, the flow of the material of said mold body will cause a reduction of the cavity therein to the shape and size of an article to be molded, means formed of relatively non-yielding material for laterally confining said mold body, means formed of relatively non-yielding material for closing the ends of said laterally confining means at least one of said end closing means being axially movable in respect to said laterally confining means for applying axial pressure for molding an article, said mold body having a beveled surface on its exterior substantially opposite said shoulder on the article, said beveled surface being arranged to engage a similarly beveled surface formed on a portion of relatively non-yielding material, which similarly beveled surface faces said shoulder, said portion being rigid with one of said means formed of relatively non-yielding material and being relatively axially moved with respect to one of said end closing means during the molding operation, whereby solely axial pressure applied to at least one of said end closing means will be resolved in part to lateral force by said beveled surfaces, tending to cause lateral flow of a part of said mold body toward the mold cavity therein.

HENRY L. CROWLEY.
ARTHUR M. HOSSENLOPP.

REFERENCES CITED

The following references are of record in the file of this patent:

UNITED STATES PATENTS

| Number | Name | Date |
| --- | --- | --- |
| 2,091,973 | Fessler et al. | Sept. 7, 1937 |
| 2,152,738 | Jeffery | Apr. 4, 1939 |
| 2,448,640 | Weston | Sept. 7, 1948 |